United States Patent Office 2,696,493
Patented Dec. 7, 1954

2,696,493

PROCESS OF RECOVERING OXYGENATED ORGANIC COMPOUNDS

Walter Rottig, Oberhausen-Sterkrade-Nord, Germany, assignor to Ruhrchemie Aktiengesellschaft, Oberhausen-Holten, Germany, a joint-stock company of Germany No Drawing. Application November 16, 1949, Serial No. 127,797

Claims priority, application Germany June 20, 1949

3 Claims. (Cl. 260—450)

This invention relates to the hydrogenation of carbon monoxide in the presence of catalysts. It concerns more particularly the removal, from the main products of the hydrogenation process, of oxygen-containing compounds admixed with these products.

As is well known, when carbon monoxide is reacted with hydrogen in the presence of a catalyst, there are formed, besides hydrocarbons, also varying quantities of compounds containing oxygen, such as alcohols, ketones, aldehydes, esters and organic acids. Low molecular compounds of this class are water-soluble and are mostly to be found in the water condensed at the end of the synthetical process. The higher molecular compounds of this class are insoluble in water and mixed with the non-aqueous (oily) products resulting in the synthetical process. The acids present as by-products in the aqueous as well as the non-aqueous products of the synthetical process possess strongly corrosive properties and must be removed carefully in view of the injurious action they might exert on the apparatuses in which the products of reaction are subjected to further treatment.

If the synthetical process is conducted in such manner that hydrocarbons are formed in the first place, for instance when cobalt catalysts are present, a high percentage of water is formed in the reaction containing a low percentage of organic oxygen compounds which hitherto were not subjected to further treatment, but were removed as waste. Merely the neutralization of the non-aqueous by-products seemed to be of interest. One has for instance treated the non-aqueous by-products of the process of hydrogenation of carbon monoxide with solutions of alkali hydroxides until the free alkali was neutralized for the greater part and the compounds (soap) formed by the carboxylic acids and the alkali were separated from the neutralization solution by cooling.

Under certain conditions of operation and more especially if iron catalysts are used, the catalytic process of hydrogenation of carbon monoxide can also be carried out in such manner that besides hydrocarbons there are formed considerable quantities of oxygen-containing compounds. In this case, contrary to the normal process of producing hydrocarbons by a synthetical process, only a small quantity of reaction water is formed, but in this water there will be found up to and beyond 50%, calculated on the water present, of the low molecular organic compounds. In order to recover these organic constituents, it is necessary to first neutralize this solution.

The non-aqueous products of the synthetical process, if iron catalysts are used, also contain greater percentages of free carboxylic acids which must also be neutralized with alkali before subjecting the synthetical products to further treatment.

I have now found that the neutralization of the aqueous and the non-aqueous products of the synthetical process can be combined in an advantageous manner by first separating the watery layer containing the water-soluble compounds from the oily layer containing the water-insoluble compounds, then treating the watery layer with hydroxides and/or carbonates of an alkali or an alkaline earth metal, then adding once more a hydroxide and/or carbonate of an alkali or an alkaline earth metal to the watery solution resulting in the first treatment after the removal of the oily layer separated by neutralization, whereupon the watery solution thus treated is used for treating the alcohol layer. The salts formed in this procedure are isolated from the watery solution by evaporation and/or crystallisation. Solutions of ammonia or ammonium carbonates may also serve as neutralization agents.

In the operation of the process according to this invention the water-soluble products formed in the synthetical process are first treated with alkali compounds, preferably with a hydroxide, carbonate of potassium, sodium or ammonium or with other suitable compounds of adequate alkaline reaction, for instance alkaline earth compounds. During the neutralization of the water of reaction the solid and liquid constituents frequently separate out in layers above the water-soluble solution. The liquid constituents in these layers mainly are alcohols, the solid constituents are mainly organic alkali salts.

To the water-soluble solution remaining over after the non-aqueous layer has been removed, are once more added alkali compounds in excess of the stoichiometric quantity and the solution is now used for lixiviating the products insoluble in water of the synthetical process. This operation may take place under vigorous stirring at normal or raised temperature. I have found it particularly useful to treat the products of the synthetical process with the hydroxides or carbonates of an alkali or alkaline earth metal in counter-current at a temperature ranging for instance from 80 to 120° C. After neutralization the fatty acids present in products insoluble in water of the synthetical process separate out in the form of their salts, preferably solid potassium or sodium compounds which can easily be separated by filtration, while the watery solution, freed from corrosive constituents, is subjected to distillation. During the distillation there are driven over at first low boiling organic compounds. Owing to the ensuing increase of salt concentration, a further proportion of fatty acid salts corresponding to the percentage of organic acids present is recovered by filtration and the salts thus obtained, mostly alkali compounds, can be separated by fractionation.

By completely evaporating the watery neutralization solution, the last traces of organic compounds can be recovered.

If aldehydes are present in greater proportion in the water soluble products soluble and/or the products insoluble in water of the synthetical process and if it is desired to recover them, alkali carbonates or bicarbonates must be used for neutralization of the synthetical products, because, if alkali hydroxides were used, the aldehydes might undergo undesirable changes by aldol condensation.

In the operation of the process according to this invention, I have for instance proceeded as follows.

*Example*

A catalyst consisting of 100 parts by weight iron, 5 parts copper, 10 parts kieselguhr and 3 parts alkali, was reduced at 250° C. during 90 minutes by means of hydrogen flowing at the rate of 1.5 m./sec. under a pressure of 10 kg./sq. cm. The catalyst was then made to act on water gas at 160° C., 100 normal liters of gas being passed per hour in contact with every liter of the catalyst. Within a period of 6 days the temperature in the reaction zone was gradually raised to 195° C. The synthetic products resulting in the catalytic reaction contained a considerable proportion of oxygen compounds, mostly alcohols, but also considerable quantities of acids, esters and aldehydes. Before these products could be subjected to distillation, the reaction water as well as the water-insoluble by-products had to be treated with alkaline compounds in order to free them from their corrosive properties and to recover fatty acids. The reaction water, having a neutralization number of 60, required 60 gr. alkali to be added per liter in the form of potassium hydroxide. Owing to the high percentage (more than 50%) of oxygen-containing compounds, an upper layer formed containing mainly propyl alcohol and butyl alcohol. This layer was separated and potassium hydroxide was once more added to the residual reaction water, the quantity required being determined by ascertaining the neutralization number in the organic synthetic products and adding 10% to the resulting quantity of KOH. The water-insoluble products of the synthetical process were then treated with the alkaline solution, partly using an agitating device and partly by mixing the liquid in counter-current, until the organic products were freed from the carboxylic acids.

A small part of the potassium salts formed separated out above the watery solution and was removed by filtration.

In order to recover the last traces of organic compounds, the solution was subjected to distillation. After distilling off the lower-boiling constituents up to and including a binary mixture of propyl alcohol and water, the solution was cooled. During this operation a further quantity of organic potassium salts crystallised out. The watery phase was then evaporated to dryness. During this evaporation salts of low-molecular carboxylic acids crystallized out almost exclusively.

Many changes may be made in the performance of the process and in the materials used therein without departing from the invention or sacrificing the advantages thereof.

I claim:

1. A process for recovering alcohols, esters, carboxylic acids and aldehydes from a mixture of water, water-soluble and water-insoluble compounds obtained by catalytic hydrogenation of carbon monoxide over an iron catalyst and containing a high proportion of oxygenated products comprising separating a watery layer of said mixture containing the water-soluble compounds from an oily layer containing the water-insoluble compounds, neutralizing the separated watery layer by adding the stoichiometrical amount of an alkaline compound selected from the class consisting of the hydroxides and carbonates of the alkali and alkaline earth metals required to convert the fatty acids present into their salts, separating from the water solution thus produced the upper alcohol layer containing lower alcohols, acting on the residual water solution with approximately 10% excess of an alkaline compound of said previously mentioned class, lixiviating the oily layer of the first step with the alkaline-water solution last mentioned to free the organic products present from carboxylic acids present and form an aqueous solution, distilling off the lower-boiling constituents from said last-mentioned aqueous solution up to and including a binary mixture of propyl alcohol and water, cooling the remaining aqueous solution to crystallize out organic alkaline salts formed, separating the alkaline salts from the aqueous phase and evaporating the residual aqueous phase to dryness to recover low-molecular weight salts of carboxylic acids, said treatments with the alkaline compound being carried out at about 80° to 120° C.

2. The process of claim 1 in which the alkaline compound is a carbonate.

3. The process of claim 1 in which the alkaline compound is an alkali metal hydroxide.

References Cited in the file of this patent

UNITED STATES PATENTS

| Number | Name | Date |
|---|---|---|
| 2,470,782 | McGrath et al. | May 24, 1949 |
| 2,494,371 | Wadley | Jan. 10, 1950 |
| 2,535,069 | Johnson | Dec. 26, 1950 |
| 2,539,394 | Arnold et al. | Jan. 30, 1951 |
| 2,571,151 | McGrath et al. | Oct. 10, 1951 |